May 1, 1951

A. CASAGRANDE 2,550,971

CENTRIFUGAL POWER TRANSMISSION

Filed Aug. 6, 1947

INVENTOR
ALDO CASAGRANDE

By Richardson, David and Vordon

ATTORNEYS

Patented May 1, 1951

2,550,971

UNITED STATES PATENT OFFICE 2,550,971

CENTRIFUGAL POWER TRANSMISSION

Aldo Casagrande, Milan, Italy

Application August 6, 1947, Serial No. 766,493
In Italy August 9, 1946

4 Claims. (Cl. 74—665)

The present invention relates to continuous automatic centrifugal power transmissions.

The principle of the continuous centrifugal power transmission is well known as the machines are used in several industries, particularly the chemical industry. The centrifugal power transmissions heretobefore used, however, possess many disadvantages in that the driving shafts and transmission gear are inaccessible and consequently difficult to repair and, moreover, difficult to mount on the machine. A further disadvantage lies in the fact that the lubricating oil pipes are subjected to a considerable amount of wear by the parts being lubricated whilst, in addition, such oil pipes are subjected to shocks during working of the machine. The centrifugal power transmission of the present invention possesses features to overcome these disadvantages.

Accordingly, a horizontal tunnel is cored in one of the three inner ribs of the frame of the machine for the horizontal passage therethrough of the driving shaft which is adapted to drive the central vertical shaft of the machine. In a position diametrically opposed to the driving shaft, an intermediate shaft is vertically opposed to the driving shaft, an intermediate shaft is vertically mounted for the purpose of transmitting the motion from the said driving shaft to the hollow shaft arranged coaxially of the central vertical shaft and constituting therewith the main shaft of the machine.

This construction results in the advantage that it is possible to mount the driving shaft and the intermediate shaft about independent centres, thus rendering the mounting and setting of the said shafts about the central main shaft a comparatively easy operation, whilst also rendering possible the correct meshing of the gears which may be of the helical toothed type.

The inner part of the frame, constituting a bell-shaped chamber is thus free of any obstacles to the falling of the centrifuged materials with the exception—of course—of the three before mentioned ribs necessary to the structural strength of the machine. The frame of the machine is so constructed that part of the passage of the oil circulation for the lubrication of various parts of the machine, coincide with the ribs and, accordingly the lubricating oil is caused to pass through the ribs either by embodying therein the pipes for the oil or providing passages therethrough.

In order that the present invention may be readily understood reference will be made to the accompanying drawings which illustrate, by way of example, an embodiment of the present invention.

Figure 1:
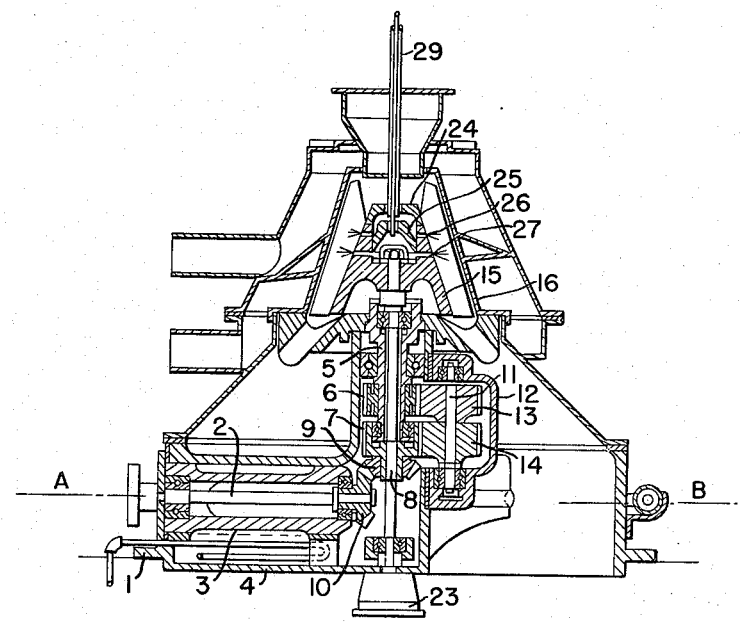
Fig. 1 shows a vertical and detailed sectional view of the machine.

In the frame 1 of the continuous centrifugal power transmission, shown in Fig. 1, which is of open bell-shape in order to provide the best conditions for the free falling of the centrifuged materials, the inner rib 4 is of trapezoidal cross-section through which the sleeve 3 is introduced from the outer end and carrying the horizontal driving shaft 2 on which is mounted the bevel gear 10 having helical teeth meshing with the helical gear wheel 9 carried by the inner conical member 15.

Thus, the direct engagement between the horizontal driving shaft 2 and the central vertical shaft 8 is effected, such engagement being rendered adjustable by the adjustment of the sleeve 3 within the tunnelled rib 4, so making possible the easy adjustment of the bevel gears 9 and 10 when wear occurs or when it is necessary to replace them, and also to obtain a silent drive. In the lower part of the tunnel in the rib 4 a coiled pipe 32 is introduced having the inlet and outlet ends 33 and 34 respectively to lie below the lubricating oil contained in the said lower portion of the rib 4, cold water passing through the pipe 32 to provide a cooling medium for the lubricating oil.

The intermediate vertical shaft 11, within its housing 12 and together with its helical gears 13 and 14, is suitably mounted on the frame 1 and arranged parallel with the central main shaft 8 in a position diametrically opposed to the horizontal driving shaft 2, as will be seen from the drawings, and providing the transmission medium for the vertical hollow shaft 5 coaxial of the shaft 8 and on which is mounted the frusto-conical perforated basket 16. Actually, the cylindrical helical gear 7 mounted on the shaft 8 is engaged by the cylindrical helical gear 14 mounted on the intermediate shaft 11, and the cylindrical helical gear 13, which is also mounted on the intermediate shaft 11 is in mesh with the cylindrical helical gear 6 mounted on the hollow shaft 5. In this way the frusto-conical perforated basket 16 is caused to make a predetermined number of revolutions which differs from that made by the inner cone 15 since the two pairs of gears 7–14 and 6–13 are of different ratios.

By the present invention, also, the position of the intermediate shaft 11 is adjustable in relation to the central main shaft and, moreover, the perfect engagement of the before mentioned gearing is rendered possible as is the easy mounting of the different mechanical parts of the machine and their easy replacement whilst the adjustment of the gearing centres is possible in order to take up wear in the gears and to reduce a possible noisy drive.

Figure 2:
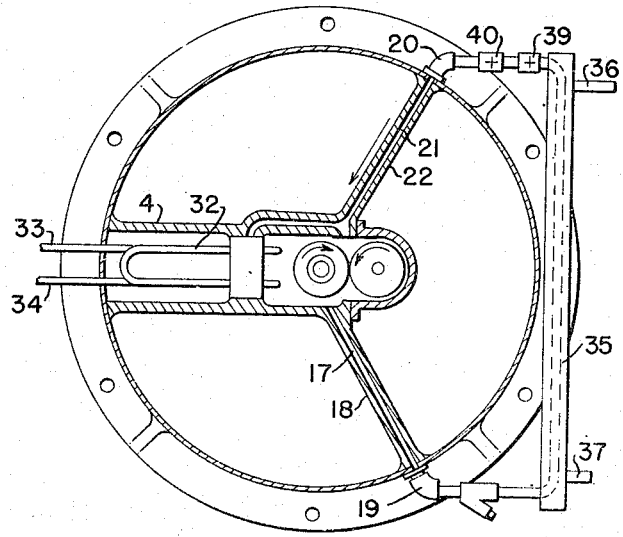
Fig. 2 represents a sectional plan view on the line A—B of Fig. 1.

Reference to Fig. 2 will show more clearly the particular arrangement of the piping or passage for the circulation of lubricating oil. By means of the pump 23 the lubricating oil is passed along the pipe 17 embodied in the rib 18 of the frame 1 of the machine, reaching the fitting 19 to enter the portion of the pipe line carrying the cooling device of the circulating oil; the outlet filter and the manometer or pressure gauge (which will also act as a control device) passing then to the filter 20 for communication to the second portion of the inner pipe line located within the rib 22 of the frame 1.

The distribution of the oil to the various parts of the machine is thus effected flowing always into the central body of the frame or into the inner gap of the said central body. As will be understood in no part of the machine will the pipe line for the lubricating oil be subject to wear due to mechanical action or chemical action in the working of the machine or by the materials passing therethrough.

In practice the details of construction may be varied in any way without departing from the principle of the invention.

Having now particularly described and ascertained the nature of my said invention and in what manner the same is to be performed, I declare that what I claim is:

1. In a centrifugal machine, a driving mechanism for rotating a basket at different speeds, comprising a frame provided with a vertical cavity, a horizontal cavity communicating with said vertical cavity and a lateral aperture communicating with said vertical cavity, two vertical coaxial shafts in said vertical cavity bearing each a spur gear in correspondence to said aperture, a cover piece adjustably fastened in front of said aperture and bearing a vertical loose shaft on which two spur gears are keyed meshing with said first mentioned spur gears, a bevel gear on one of said first mentioned vertical shafts, a horizontal shaft supported by a support piece axially adjustable within said horizontal cavity and bearing at its end a bevel gear meshing with said first mentioned bevel gear.

2. In a centrifugal machine, a driving mechanism for rotating a basket and a rotatable member inside said basket at different speeds, comprising a frame provided with a vertical cavity, a horizontal cavity communicating with said vertical cavity and a lateral aperture communicating with said vertical cavity, two vertical coaxial shafts in said vertical cavity bearing each a helical spur gear in correspondence to said aperture, a cover piece adjustably fastened in front of said aperture and bearing a vertical loose shaft on which two helical spur gears are keyed meshing with said first mentioned spur gears, a bevel gear on one of said first mentioned vertical shafts, a horizontal shaft supported by a support piece axially adjustable within said horizontal cavity and bearing at its end a bevel gear meshing with said first mentioned bevel gear.

3. In a centrifugal machine, a driving mechanism for rotating a basket and a rotatable member inside said basket at different speeds, comprising a frame provided with a vertical cavity, a horizontal cavity communicating with said vertical cavity and a lateral aperture communicating with said vertical cavity, two vertical coaxial shafts in said vertical cavity bearing each a spur gear in correspondence to said aperture, a cover piece adjustably fastened in front of said aperture and bearing a vertical loose shaft on which two spur gears are keyed meshing with said first mentioned spur gears, a bevel gear on one of said first mentioned vertical shafts, a horizontal shaft supported by a support piece axially adjustable within said horizontal cavity and bearing at its end a bevel gear meshing with said first mentioned bevel gear, said horizontal cavity being oil tight and provided with a water pipe passing therethrough for cooling purposes.

4. In a centrifugal machine, a driving mechanism for rotating a basket and a rotatable member inside said basket at different speeds, comprising a frame provided with a vertical cavity, a horizontal cavity communicating with said vertical cavity and a lateral aperture communicating with said vertical cavity, two vertical coaxial shafts in said vertical cavity bearing each a spur gear in correspondence to said aperture, a cover piece adjustably fastened in front of said aperture and bearing a vertical loose shaft on which two spur gears are keyed meshing with said first mentioned spur gears, a bevel gear on one said first mentioned vertical shafts a horizontal shaft supported by a support piece axially adjustable within said horizontal cavity and bearing at its end a bevel gear meshing with said first mentioned bevel gear, said horizontal cavity being oil tight and communicating with a chamber containing a water pipe for cooling purposes.

ALDO CASAGRANDE.

REFERENCES CITED

The following references are of record in the file of this patent:

UNITED STATES PATENTS

| Number | Name | Date |
| --- | --- | --- |
| 1,006,768 | McMullen | Oct. 24, 1911 |
| 1,643,503 | Kuchenmeister | Sept. 27, 1927 |

FOREIGN PATENTS

| Number | Country | Date |
| --- | --- | --- |
| 22,760 | Great Britain | Oct. 15, 1906 |
| 648,618 | France | Aug. 14, 1928 |